July 5, 1932.  R. E. JACOBS  1,865,859
AIRPLANE
Filed Aug. 29, 1930
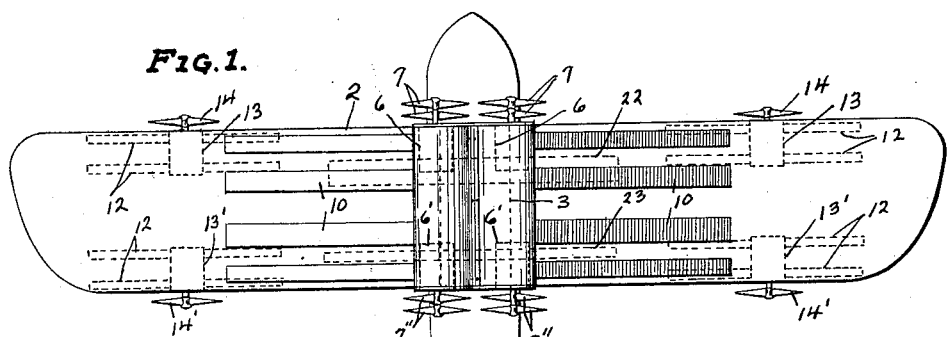
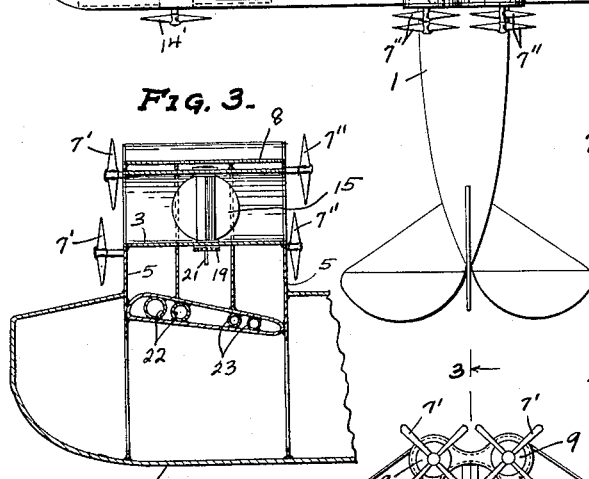
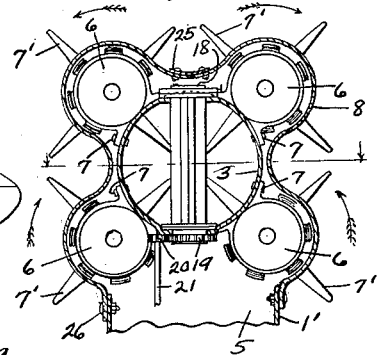
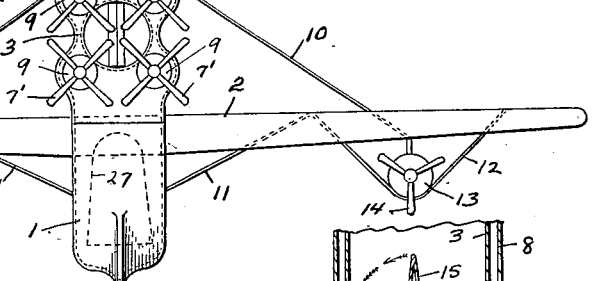
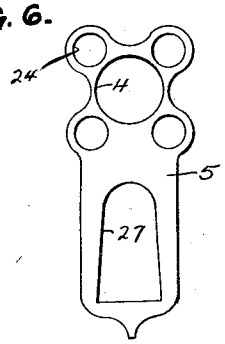
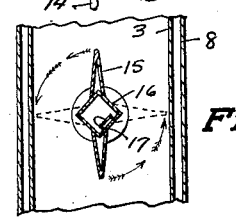
INVENTOR.
REED E. JACOBS
BY *Miller Boykin & Fried*
ATTORNEYS.

Patented July 5, 1932

1,865,859

UNITED STATES PATENT OFFICE

REED E. JACOBS, OF ALAMEDA, CALIFORNIA, ASSIGNOR OF ONE-THIRD TO GRANVILLE Q. STEWART, OF SAN FRANCISCO, CALIFORNIA

AIRPLANE

Application filed August 29, 1930. Serial No. 478,632.

This invention relates principally to airplane body construction and motor assemblage, though it may also be useful in connection with lighter than air type of air vehicles.

The objects of the invention are to provide a multiplicity drive in combination with novel supporting construction adapted to give the highest efficiency combined with strength and simplicity.

Briefly described, my invention comprises arranging a large open-ended tube parallel with and above the fuselage braced in a certain manner thereto, and of securing a plurality of drive motors around the outside of this tube, as by bolting directly thereto, said motors being equipped with pulling and pushing propellers overlying the tube so as to force the air partially therethrough, thus greatly increasing the lift of the machine. Other motors equipped with propellers are located fore and aft under the main wing structure, which in my preferred form is positioned below the large tube and above the fuselage proper.

Other features of the invention will appear in the following description and claims.

In the drawing accompanying this specification—

Fig. 1 is a plan view of my improved construction applied to a monoplane of the amphibian type.

Fig. 2 is a front view of the plane.

Fig. 3 is a longitudinal section taken along the line 3—3 of Fig. 2 showing the large tube above the fuselage and its mode of attachment thereto.

Fig. 4 is an enlarged cross section of the large tube and motors bolted thereto, as seen from the line 4—4 of Fig. 1.

Fig. 5 is a horizontal section of the large tube as seen from the line 5—5 of Fig. 4 showing the damper in the tube.

Fig. 6 is a front view of one of the structural plates which support the large tube above the fuselage and tie the whole structure together.

In further detail, the plane is shown as provided with a boat-shaped body or fuselage 1 over the upper portion of which crosses a large wing 2 and above which wing is mounted a large tube 3 preferably of thin steel or lighter metal. This tube is relatively large and for a fair size plane is preferably about ten feet in diameter by about twenty-five feet long.

The tube is mounted by welding it in openings 4 (Fig. 6) of two flat vertical plates 5 which pass downward into the body 1 against the front and rear edge of the wing 2 and are preferably welded along the edges to the walls of the body, also to the wing structure, so as to form a plurality of vertical plates extending transversely of the body and forming with the tube an extremely rigid structure to carry the motors.

Secured at spaced points around the outer side of the large tube 3 are a plurality of motors or rather engines 6 of any desirable type with their bases curved to fit against the tube and preferably bolted directly to it as at 7. In the present disclosure there are four motors at the forward end of the tube and four at the rearward end arranged on centers spaced 90° apart or 45° from the horizontal, each carrying a propeller. The propeller 7' of the forward motor being of the puller type in front of their motors 6 and the propellers 7'' of the rearward motors 6' being of the pusher type at the rear of their motors, the front and rear motors and propellers being aligned as indicated with the propeller blades overlapping one another and overlapping the tube 3 as best shown in Fig. 2 and by reason of which the propellers are also offset when viewed in plan (as shown in Fig. 1) so as to miss one another in rotating and the blades are pitched to provide for rotating them in the manner indicated in Fig. 4—that is turning into the area of the tube 3 from the sides of the tube on the horizontal axis. It will be noticed by Fig. 2 that a small central area or core of the large tube is not traversed by the blades of the propeller.

Surrounding the motors is a covering sheet of metal 8 which extends up from the side walls 1' of the fuselage and follows the form of the assemblage while providing a small space for cooling air to pass through from the open spaces 9 around the ends of the motors.

The motor and tube assemblage is angularly braced to the wing by relatively wide braces 10 of flat sheet material disposed in a plane substantially parallel with the plane of the wings, and the body by braces 11, while further U-shaped braces 12 under the wing support four more forward and rearward motors 13, 13' in turn fitted respectively with pulling and pushing propellers 14, 14'. These motors and propellers are aligned fore and aft as are the motors 6, 6' and the propellers 14, 14' operate entirely below the wing 2.

Mounted centrally within the large tube 3 is a round damper 15 provided with a large hollow square shaft 16 large enough for a man to crawl through on a ladder 17 to reach the upper motors by an arm thrust through a slidable or pivoted cover plate 18.

This damper is controlled from the fuselage by any suitable arrangement such as the large gear 19 at the lower end of the damper shaft meshing pinion 20 turned by vertical shaft 21 and is for the purpose of braking the speed of the machine, especially when descending as it makes it possible to land at a slower speed, but it is kept parallel to the longitudinal axis of the tube when in full flight.

The fuel oil or gasoline for the motors is carried in horizontally extending tubes 22 in the hollow wing and the cooling water in similar tubes 23, all tubes preferably welded to the wing members so as to form an integral structural unit.

Plates 5 are formed at their upper ends to fit within and sustain the cover sheet 8 surrounding the motors and the openings 24 are made large enough to permit a draft from the propellers to pass over the motors for cooling the same.

Cover sheet 8 is preferably made detachable along the upper center as by a bolting gusset 25, and also at the sides where it joins the fuselage sides as at 26 so that when necessary to take down the motors for overhauling the cover sections may be removed, though minor adjustments may be made while in flight through the free accessibility of the lower motors from within the communication to the fuselage, and the upper ones through the hollow damper shaft.

Vertical suspension plates 5 are provided with large openings 27 to afford a through passageway in the fuselage.

As the invention relates to the general structure described and not to the usual controls and other details which may vary greatly with different manufactures of airplanes, no extension of the specification is thought necessary.

By the arrangement described I secure a multiplicity drive with utmost simplicity and greatest strength without subjecting the wing to excessive strains as done where a plurality of engines are mounted upon it as heretofore done. The large tube greatly aids in the sustaining power of the plane as well as stabilizes it against constant deviation in flight while at the same time providing the necessary structural base upon which to mount a plurality of motors not obtainable in prior designs insofar as I am aware.

I therefore claim:

1. In an air vehicle a fuselage body, a relatively large tube arranged parallel with the body, means securing the tube and body together, and a plurality of driving motors secured to said tube, each motor provided with a propeller on its drive shaft with the propellers entirely outside the tube and arranged to overlap an open end thereof.

2. In an air vehicle a fuselage body, a relatively large tube arranged parallel with the body, means securing the tube and body together, and four driving motors secured at equally spaced points around the outside of said tube adjacent opposite ends thereof.

3. In an air vehicle a fuselage body, a relatively large tube arranged parallel with the body, means securing the tube and body together, and a plurality of driving motors secured to said tube, some of said motors being at the forward and some at the rearward end of said tube and fitted respectively with pulling and pushing propellers, said propellers positioned outside the tube beyond the front and rear open ends of the tube respectively.

4. In an air vehicle, a fuselage body, a relatively large tube arranged parallel with the body, means securing the tube and body together, and a plurality of driving motors secured to said tube, some of said motors being at the forward and some at the rearward end of said tube and fitted respectively with pulling and pushing propellers with blades in overlapping relation to the area of said tube.

5. In an air vehicle, a fuselage body, a relatively large tube arranged parallel with the body, means securing the tube and body together, a plurality of driving motors secured to said tube, some of said motors being at the forward and some at the rearward end of said tube and fitted respectively with pulling and pushing propellers with blades in overlapping relation to the area of said tube, a main supporting wing on said vehicle and a plurality of driving motors mounted under the wing.

6. In an air vehicle, a fuselage body, a relatively large tube arranged parallel with the body, means securing the tube and body together, a plurality of driving motors secured to said tube substantially midway of its ends, some of said motors being at the forward and some at the rearward end of said tube and fitted respectively with pulling and pushing propellers with blades in overlapping relation to the area of said tube, a main supporting wing on said vehicle and a plurality of driving motors mounted under the wing provided with pulling and pushing propellers.

7. In an air vehicle a fuselage body, a relatively large tube arranged parallel with the body, means securing the tube and body together, a plurality of driving motors secured to said tube, and a damper in said tube substantially midway of its ends arranged for control by the pilot for closing more or less the tube area.

8. In an air vehicle, a fuselage body, a relatively large tube arranged parallel with the body, means securing the tube and body together, a plurality of driving motors secured to said tube, and a damper in said tube arranged for control by the pilot for closing more or less the tube area, said damper provided with a hollow shaft adapted for passage of a man from the fuselage for adjusting the mechanism.

9. In an air vehicle, a fuselage body, a relatively large tube arranged parallel with the body, means securing the tube and body together, and a plurality of driving motors secured to said tube, said means comprising a plurality of vertically arranged plates embracing the tube and fitting against the fuselage construction.

10. In an air vehicle, a fuselage body, a relatively large tube arranged parallel with the body, means securing the tube and body together, and a plurality of driving motors secured to said tube, said means comprising a plurality of vertically arranged plates embracing the tube and fitting against the fuselage construction all welded together as a unit.

11. In an air vehicle, a fuselage body, a relatively large tube arranged parallel with the body, means securing the tube and body together, a plurality of driving motors secured to said tube, said means comprising a plurality of vertically arranged plates embracing the tube and fitting against the fuselage construction, and a main supporting wing for the vehicle extending transversely of the fuselage positioned between the tube and the fuselage.

12. In an air vehicle, a fuselage body, a relatively large tube arranged parallel with the body, means securing the tube and body together, a plurality of driving motors secured to said tube, said means comprising a plurality of vertically arranged plates embracing the tube and fitting against the fuselage construction, and a main supporting wing for the vehicle extending transversely of the fuselage positioned between the tube and the fuselage welded to said plates.

13. In an air vehicle, a fuselage body, a relatively large tube arranged parallel with the body, means securing the tube and body together, a plurality of driving motors secured to said tube, said means comprising a plurality of vertically arranged plates embracing the tube and fitting against the fuselage construction and formed with openings for the tube, motors and fuselage passageway.

14. In a structure as specified in claim 11, a cylindrical fuel container within the wing extending longitudinally thereof and united to form a structural unit therewith.

15. In a structure as specified in claim 11, a plurality of cylindrical containers within the wing extending longitudinally thereof and united to form a structural unit therewith.

16. An airplane having a fuselage and a transversely extending wing, a relatively large open-ended tube mounted above the fuselage extending across the wing, a plurality of driving motors mounted around the outside of said tube some adjacent the forward and some adjacent the rearward end of the tube, pulling propellers carried at the forward ends of the forward motors and pushing propellers carried at the rearward ends of the rearward motors.

17. In a structure as specified in claim 16, a plurality of motors carried under the wing adjacent the forward and rearward edges thereof, and pulling propellers on the forward motors under the wing and pushing propellers on the rearward motors under the wing.

18. In an air vehicle of the character described having a relatively large tube arranged parallel with the body and secured thereto, four driving motors bolted around the outside of the tube spaced 90° from each other and 45° from a horizontal line extending through and perpendicular to the horizontal axis of the tube.

19. In an air vehicle including a fuselage body and wings extending laterally from opposite sides of the body, a relatively large tube above and parallel with the body, means securing the tube and body together, a plurality of driving motors secured at spaced points around the outside of said tube, means bracing the motor and tube assemblage to the wings comprising flat braces of sheet material secured at an end each to the wings on opposite sides of the tube and disposed in a plane substantially parallel with the wings, said braces secured at their opposite ends to the upper side of the motor and tube assemblage.

REED E. JACOBS.